United States Patent
Lee (10) Patent No.: US 9,883,195 B2
(45) Date of Patent: Jan. 30, 2018

(54) IMAGE PROCESSING SYSTEM AND METHOD FOR DECODING DURING NON-RENDERING PERIOD

(71) Applicant: Hanwha Techwin Co., Ltd., Changwon-si (KR)

(72) Inventor: Hyun Gyu Lee, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 139 days.

(21) Appl. No.: 14/992,198

(22) Filed: Jan. 11, 2016

(65) Prior Publication Data

US 2016/0277753 A1    Sep. 22, 2016

(30) Foreign Application Priority Data

Mar. 17, 2015    (KR) ........................ 10-2015-0036563

(51) Int. Cl.
| | |
|---|---|
| *G06K 9/36* | (2006.01) |
| *H04N 19/44* | (2014.01) |
| *G06T 1/20* | (2006.01) |
| *G09G 5/00* | (2006.01) |
| *H04N 7/18* | (2006.01) |

(52) U.S. Cl.
CPC ............... *H04N 19/44* (2014.11); *G06T 1/20* (2013.01); *G09G 5/005* (2013.01); *H04N 7/18* (2013.01); *H04N 7/183* (2013.01); *G06T 2200/28* (2013.01); *G09G 2340/02* (2013.01); *G09G 2340/0435* (2013.01)

(58) Field of Classification Search
CPC ......... G06F 3/14; G06T 1/20; G06T 2200/28; G09G 2340/02; G09G 2340/0435; G09G 5/005; H04N 19/44; H04N 7/18; H04N 7/183
See application file for complete search history.

(56) References Cited

U.S. PATENT DOCUMENTS

| | | | |
|---|---|---|---|
| 5,880,786 A | 3/1999 | Oku et al. | |
| 5,898,461 A * | 4/1999 | Ohsawa | ................... H04N 7/15 348/E7.083 |
| 6,469,744 B1 * | 10/2002 | Pearlstein | ................. G06F 3/14 348/497 |

(Continued)

FOREIGN PATENT DOCUMENTS

| | | |
|---|---|---|
| EP | 0914008 A2 | 5/1999 |
| EP | 2498494 A1 | 9/2012 |
| JP | 2002-532998 A | 10/2002 |

OTHER PUBLICATIONS

Communication dated May 27, 2016, issued by the European Patent Office in counterpart European Application No. 16160051.5.

*Primary Examiner* — Li Liu
(74) *Attorney, Agent, or Firm* — Ladas & Parry LLP (57) ABSTRACT

An image processing apparatus and a method thereof are provided. The image processing apparatus includes at least one processor configured to implement: a decoder which decodes input image data; and a rendering module which renders the decoded image data according to a rendering cycle which corresponds to a refresh rate of a display to display a plurality of image frames of the image data, wherein the decoder decodes the input image data only when the processor is not being in use for rendering by the rendering module.

14 Claims, 5 Drawing Sheets

(56) References Cited

U.S. PATENT DOCUMENTS

| | | | | |
|---|---|---|---|---|
| 8,345,768 B1* | 1/2013 | Hobbs | .................. | G06T 9/00 |
| | | | | 375/240.24 |
| 8,560,753 B1* | 10/2013 | Hobbs | .................. | G06F 3/1454 |
| | | | | 345/2.1 |
| 2002/0034377 A1* | 3/2002 | Numata | .................. | H04N 5/4401 |
| | | | | 386/245 |
| 2002/0149595 A1* | 10/2002 | Kubota | .................. | G06F 3/14 |
| | | | | 345/536 |
| 2004/0189678 A1* | 9/2004 | Yoshida | .................. | G06T 15/005 |
| | | | | 345/660 |
| 2009/0016445 A1 | 1/2009 | Gao et al. | | |
| 2011/0109624 A1* | 5/2011 | Greenberg | .................. | G06F 1/3203 |
| | | | | 345/419 |
| 2012/0262463 A1 | 10/2012 | Bakalash et al. | | |
| 2015/0181240 A1* | 6/2015 | Aoki | .................. | H04N 19/44 |
| | | | | 375/240.12 |
| 2016/0119648 A1* | 4/2016 | Yamamura | .................. | H04N 19/65 |
| | | | | 382/233 |
| 2016/0366431 A1* | 12/2016 | Kazui | .................. | H04N 19/44 |

\* cited by examiner

IMAGE PROCESSING SYSTEM AND METHOD FOR DECODING DURING NON-RENDERING PERIOD

CROSS-REFERENCE TO THE RELATED APPLICATION

This application claims priority from Korean Patent Application No. 10-2015-0036563 filed on Mar. 17, 2015 in the Korean Intellectual Property Office, the disclosure of which is incorporated herein in its entirety by reference.

BACKGROUND

1. Field

Apparatuses and methods consistent with exemplary embodiments relate to image processing, and more particularly, to image processing to minimize motion judder by preventing a decoder and a rendering part of an image processing system from using a processor of a personal computer (PC) at the same time.

2. Description of the Related Art

Closed circuit television (CCTV) images, unlike typical images, which can be viewed one at a time from a single screen, can be viewed by a user while monitoring multiple CCTV cameras at the same time. Network CCTV cameras use a computer video compression technique to reduce the amount of data to be transmitted via a network.

Image data is generally large in size and is displayed on a monitor after being subjected to compression, transmission, and decompression. These processing or computation operations are generally complicated and cause a load on an entire system. More specifically, the compression of image data is handled separately by a central processing unit (CPU) of each camera, and thus, does not suffer from an overload because the load of the system can be distributed. On the other hand, in the case of decompressing image data for display at a personal computer (PC) system or its equivalents, multiple images are viewed from multiple monitors at the same time, thereby causing an overload.

When a CPU of the PC system is overloaded, a rendering function for matching a frame rate (in frames per second (FPS)) of input image data to a refresh rate (in Hz) of a display or monitor connected to the PC system may not be properly performed, and as a result, motion judder may occur, i.e., images displayed on a monitor may judder.

SUMMARY

Exemplary embodiments of the inventive concept provide an image processing apparatus and a method capable of minimizing motion judder in an image by preventing a decoder and a rendering module from using a same processor at the same time.

According to an exemplary embodiment, there is provided an image processing apparatus which includes at least one processor configured to implement: a decoder which decodes input image data; and a rendering module which renders the decoded image data according to a rendering cycle which corresponds to a refresh rate of a display to display a plurality of image frames of the image data, wherein the decoder decodes the input image data only when the processor is not being in use for rendering by the rendering module.

According to an exemplary embodiment, there is provided an image processing method using at least one processor. The method may include: decoding input image data; rendering the decoded image data according to a rendering cycle which corresponds to a refresh rate of a display to display a plurality of image frames of the image data, wherein the decoding the input image data is performed only when the processor is not being in use for rendering by the rendering module.

Other features and exemplary embodiments will be apparent from the following detailed description, the drawings, and the claims.

DETAILED DESCRIPTION OF THE EXEMPLARY EMBODIMENTS

The inventive concept will now be described more fully hereinafter with reference to the accompanying drawings, in which exemplary embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The same reference numbers indicate the same components throughout the specification.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments will hereinafter be described with reference to the accompanying drawings.

Figure 1:
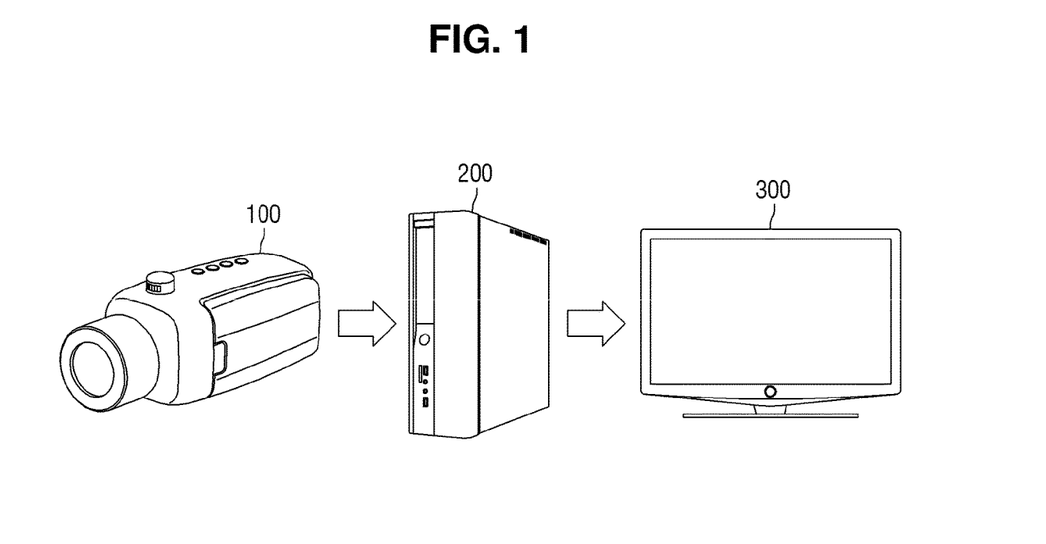
FIG. 1 is a schematic view of an image processing system, according to an exemplary embodiment.

FIG. 1 is a schematic view of an image processing system, according to an exemplary embodiment of the invention.

Figure 2:
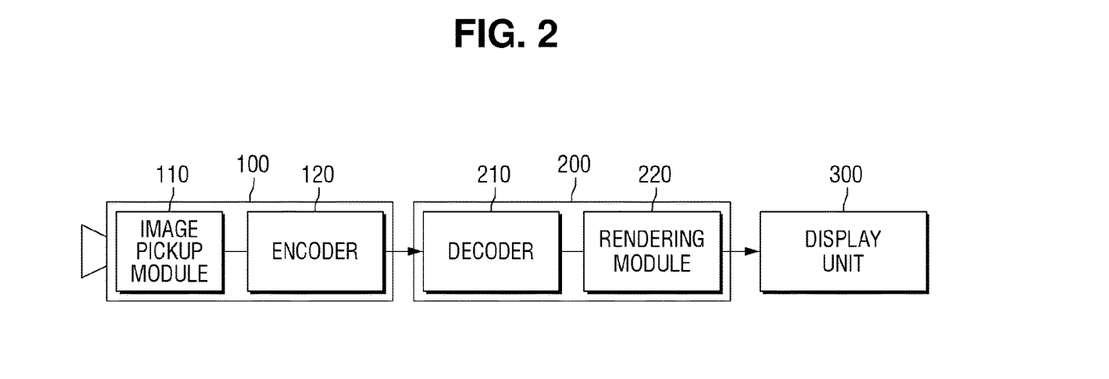
FIG. 2 is a block diagram of the image processing system of FIG. 1, according to an exemplary embodiment.

FIG. 2 is a block diagram of the image processing system of FIG. 1, according to an exemplary embodiment.

Referring to FIGS. 1 and 2, the image processing system is a system performing image processing such as decoding, rendering, and the like using the process of a personal computer (PC). The image processing system includes a camera 100, an image processing apparatus 200, and a display 300.

The camera 100 encodes image data, which is obtained by capturing an image of a subject, and outputs the encoded image data to an image processing apparatus via a network. The camera 100 includes an image pickup module 110 and an encoder 120.

The image pickup module 110 generates image data by capturing an image of a subject. The image pickup module 110 may include an image sensor such as a charge coupled device (CCD), a complementary metal oxide semiconductor (CMOS) or the like, and an image pickup component such as an optical lens. The image data include image frames such as a predicted (P) frame and an intra (I) frame.

The encoder 120 encodes the image data generated by the image pickup module 110. For example, the encoder 120 reduces the size of the image data to encode the image data. It is obvious to a person skilled in the art to which the inventive concept pertains that the encoder 120 may encode the image data generated by the image pickup module 110 into various formats such as Moving Picture Experts Group (MPEG)-1 or MPEG-4, not being limited thereto.

Although not specifically illustrated in FIGS. 1 and 2, the image processing system may also include a preprocessing module (not illustrated), which converts analog image data generated by the image pickup module 110 into digital data. The digital image data obtained by the preprocessing part may be input to the encoder 120.

The image processing apparatus 200 may be implemented as a PC equipped with at least one processor (not illustrated). In response to a frame rate (in frames per second (FPS)) of the image data generated by the camera 100 not precisely corresponding with a refresh rate of the display 300, the image processing apparatus 200 may perform correction such that the frame rate of the image data can precisely match the refresh rate of the display unit 300. The image processing apparatus 200 will be described later in detail.

The image processing apparatus 200 may include a decoder 210, a rendering module 220, and a processor (not illustrated).

The decoder 210 decodes the encoded image data provided by the encoder 120 using the processor. The decoder 210 will be described later in detail.

The rendering module 220 renders the decoded image data provided by the decoder 210 at a rendering cycle corresponding to the refresh rate of the display 300 by using the processor.

The refresh rate of the display 300 may be the number of times in a second that an image frame is output by the display 300, or the number of times per second the display 300 refreshes its screen. The refresh rate may also be defined by the number of times in a second that the display 300 updates its buffer (not shown). For example, when the display 300 has a refresh rate of 60 Hz, the display 300 outputs an image frame 60 times in one second.

A rendering cycle includes a rendering period during which the decoded image data is rendered and a non-rendering period during which the decoded image data is not rendered, and the rendering period and the non-rendering period may appear repeatedly.

The rendering module 220 renders the decoded image data using the processor so that the decoded image data corresponds to the refresh rate of the display 300. The rendering module 220 will be described later in detail.

During a period when the decoded image data is not being rendered, the rendering module 220 does not use the processor. This period may be the non-rendering period in the rendering cycle. Accordingly, the rendering module 220 renders the decoded image data using the processor according to the aforementioned rendering cycle.

While not using the processor for rendering or when rendering is stopped, the rendering module 220 generates an operation signal for the decoder 210 and transmits the operation signal to the decoder 210. That is, the rendering module 220 generates the operation signal for the decoder 210 and transmits the operation signal to the decoder 210, while not performing the image rendering. Here, the operation signal may be generated and transmitted immediately after non-use of the processor for the rendering begins or the rendering by the processor is stopped.

When the operation signal being received from the rendering module 220, the decoder 210 may determine that the processor is not being in use by the rendering module 220. Accordingly, the decoder 210 may decode the image data using the processor upon receipt of the operation signal from the rendering module 220.

The decoder 210 may decode the image data that is input within a predetermined period after the receipt of the operation signal. It is obvious to a person skilled in the art to which the inventive concept pertains that the predetermined period after the receipt of the operation signal may be included in a period when the processor is not being in use by the rendering module 220.

According to an exemplary embodiment, instead of generating the operation signal by the rendering module 220 to trigger the decoding of the image data, the decoder 210 may decode the image data by recognizing the non-rendering period in the rendering cycle which is predetermined.

According to an exemplary embodiment, the rendering module 220 may generate a decoding halt signal and may transmit the decoding halt signal to the decoder 210. When the decoding halt signal is received from the rendering module 220, the decoder 210 may determine that the processor is being in use by the rendering module 220. Accordingly, the decoder 210 may stop using the processor to decode the image data. That is, the decoder 210 may decode the image data that is input during a period between the receipt of the operation signal and the receipt of the decoding halt signal.

The rendering module 220 checks the refresh rate of the display unit 300 at predetermined time intervals. For example, the rendering module 220 may check the refresh rate of the display 300 by checking scan lines of the display 300 at intervals of 100 ms.

According to an exemplary embodiment, the rendering module 220 may check the scan lines of the display 300 using a Vertical Sync Interrupt Service to check the refresh rate of the display 300.

If the refresh rate of the display 300 is changed due to a change of a resolution of the display 300 by a user's manipulation, the rendering module 220 may identify the changed refresh rate of the display 300 and may change the rendering cycle to correspond to the changed refresh rate of the display 300.

For example, in response to the user changing the resolution of the display 300 so that the refresh rate of the display 300 is changed from 60 Hz to 75 Hz, the rendering module

220 may change the rendering cycle to 75 FPS to correspond to the changed refresh rate of the display 300.

The processor may process a large amount of computation so that multiple functions such as decoding, rendering, scaling and the like are executed. The processor may be implemented as a central processing unit (CPU) that is programmed to serve as both a processing unit and a control unit.

The rendering module 220 and the decoder 210 share the processor together, but the decoder 210 performs decoding using the processor only when the processor is not being in use by the rendering module 220. Accordingly, since the rendering module 220 and the decoder 210 do not use the processor at the same time, the rendering module 220 and the decoder 210 do not produce an excessive load on the processor, compared to a case when they use the processor at the same time. Since there is no excessive load on the processor, motion judder can be minimized when the image data is displayed on the display 300.

Although not specifically illustrated in FIGS. 1 and 2, the image processing system may also include a buffer (not illustrated), which temporarily stores image data decoded by the decoder 210.

The display 300 outputs the rendered image data. The display 300 is set to a predetermined refresh rate, and the refresh rate of the display 300 may be changed by the user's manipulation.

Figure 3A:
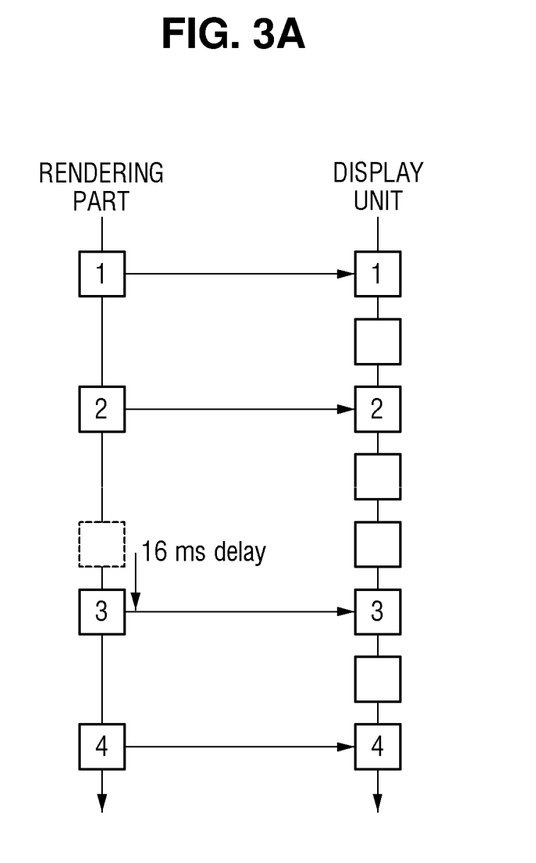
FIGS. 3A and 3B illustrate a rendering process performed by a rendering part of FIG. 2, according to exemplary embodiments.
Figure 3B:
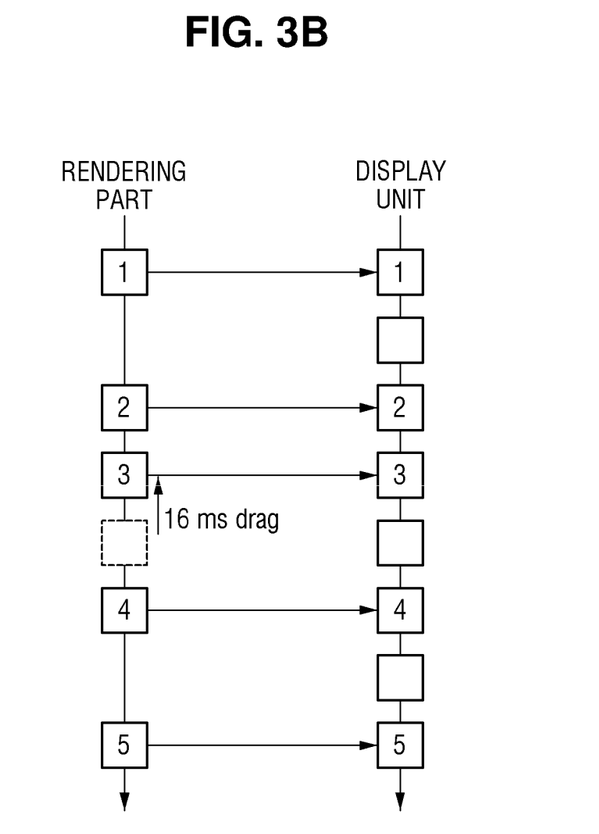

FIGS. 3A and 3B illustrate a rendering process performed by the rendering module 220.

Referring to FIGS. 2, 3A and 3B, image data captured at a frame rate of 24 FPS may not be able to be properly displayed on the display 300, which has a refresh rate of 60 Hz, simply by repeating each of the image frames of the image data only once because one repetition of each of the image frames of the image data cannot meet the refresh rate of the display 300, i.e., 60 refreshes a second. Accordingly, a technique called frame rate conversion (FRC) is used in which a half of the image frames of the image data are repeated once and the other half are repeated twice so as to achieve the refresh rate of 60 Hz.

However, as illustrated in FIGS. 3A and 3B, the interval between the image frames of the image data may differ from the interval between refreshes performed by the display 300. Thus, a correction process is needed to match the interval between the image frames of the image data to the interval between refreshes performed by the display 300, and this correction process is referred to as rendering. The interval between the image frames of the image data may be increased or reduced through rendering to meet the refresh rate of the display 300.

Figure 4:
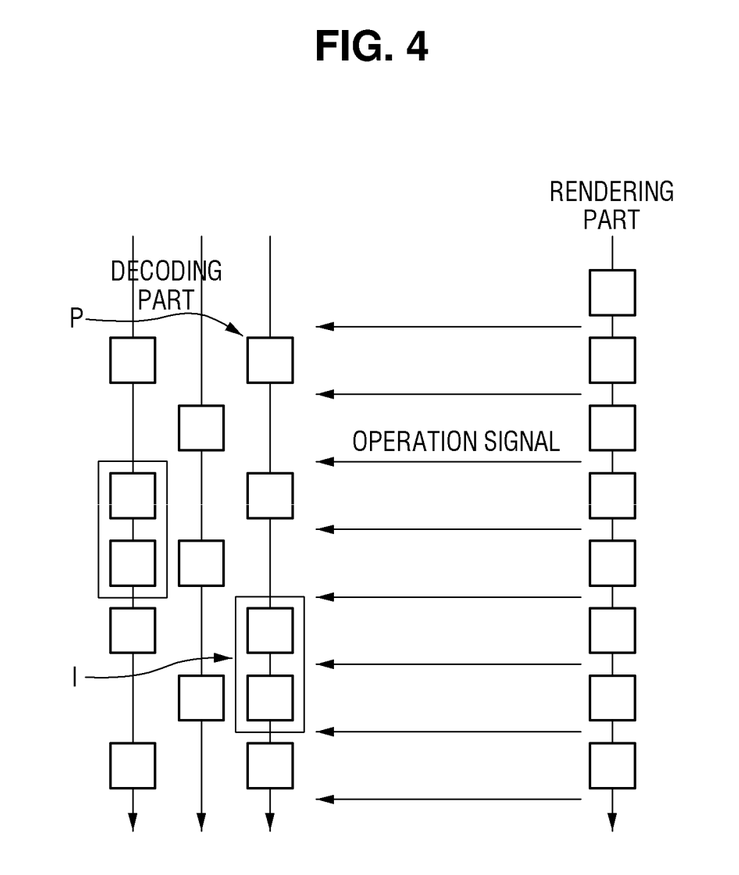
FIG. 4 illustrates a decoding process performed by a decoder of FIG. 2, according to an exemplary embodiment.

FIG. 4 illustrates a decoding process performed by the decoder 210.

Referring to FIGS. 2 and 4, when an operation signal is received from the rendering module 220, the decoder 210 performs decoding. The decoder 210 decodes input image data using the processor only when the rendering module 220 is not performing rendering.

The image data includes image frames, and there are a P frame and an I frame among the image frames.

The P frame is a frame that is decoded with reference to other frames, but the I frame is a frame that can be decoded independently without reference to other frames. Accordingly, the I frame is generally of higher quality and larger size than the P frame.

The decoder 210 may not be able to finish the decoding of the I frame, which is large in size, within the period when the processor is not being in use by the rendering module 220. Accordingly, if only part of the I frame is decoded during the period when the processor is not being in use by the rendering module 220, the decoder 210 may decode the rest of the I frame in n stages (where n is an integer greater than 0).

Figure 5:
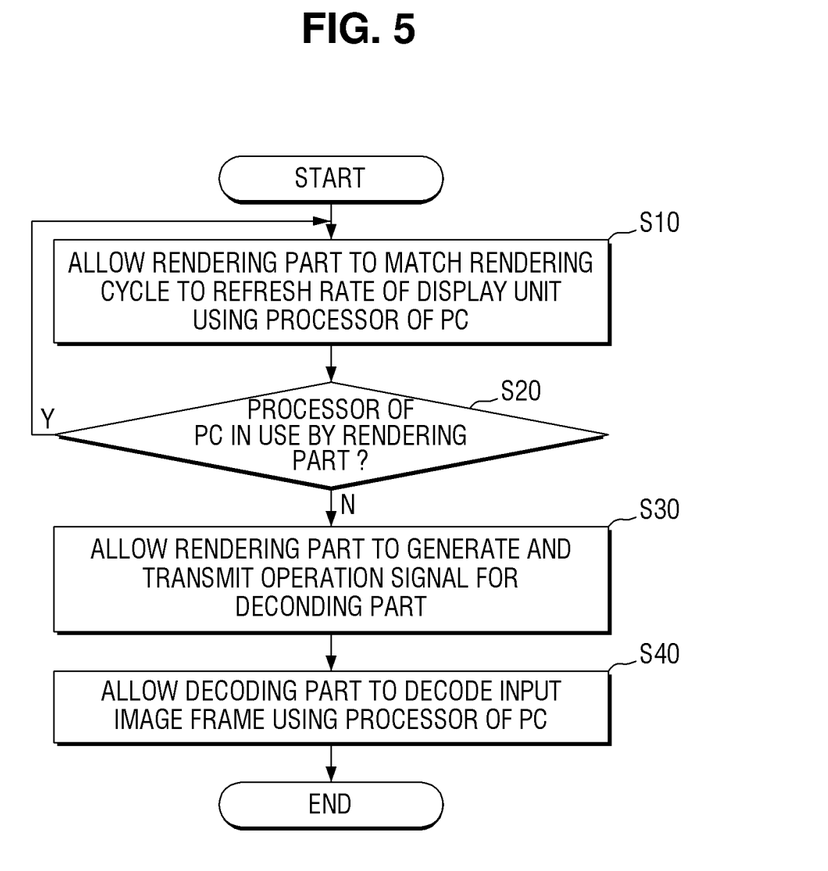
FIG. 5 is a flowchart illustrating an image processing method of an image processing system, according to an exemplary embodiment.

FIG. 5 is a flowchart illustrating an image processing method of an image processing system, according to an exemplary embodiment.

Referring to FIGS. 2 and 5, the rendering module 220 performs rendering such that a rendering cycle to correspond to the refresh rate of the display 300 (S10). Accordingly, decoded image data transmitted from the decoder 210 to the rendering module 220 can be rendered at a rendering cycle corresponding to the refresh rate of the display 300.

The rendering module 220 determines whether the processor is being used in rendering (S20). In response to determining that the processor is not being in use by the rendering module 220, an operation signal for the decoder 210 is generated, and the operation signal is transmitted to the decoder 210 (S30).

In response to the operation signal being received, the decoder 210 decodes the input image data (S40).

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIG. 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. While the above exemplary embodiments have been described with reference to the accompanying drawings, it will be understood by those of ordinary skill in the art that various changes in form and details may be made therein without departing from the spirit and scope of the inventive concept as defined by the following claims

What is claimed is:

1. An image processing apparatus comprising at least one processor configured to implement:
    a decoder which decodes input image data; and
    a rendering module which renders the decoded image data according to a rendering cycle which corresponds to a refresh rate of a display to display a plurality of image frames of the image data,
    wherein the decoder decodes the input image data only when the processor is not being in use for rendering by the rendering module, and
    wherein the rendering cycle comprises a rendering period and a non-rendering period, and the decoder decodes the input image data only during the non-rendering period and not during the rendering period.

2. The image processing apparatus of claim 1, wherein the rendering module generates an operation signal for the decoder and transmits the operation signal to the decoder when the rendering module stops rendering, and in response to the operation signal being received, the decoder decodes the input image data.

3. The image processing apparatus of claim 1, wherein in response to only part of one image frame, constituting the input image data, being decoded during a current time period when the processor is not being in use for rendering by the rendering module, the decoder decodes the rest of the image frame in a plurality of next time periods.

4. The image processing apparatus of claim 1, wherein in response to only part of one image frame constituting the input image data being decoded during a current time period when the processor is not being in use for rendering by the rendering module, the decoder decodes another part of the image frame in a next time period when the processor is not being in use for rendering by the rendering module.

5. The image processing apparatus of claim 4, wherein the next time period arrives after the current time period and a time period when the processor is used by the rendering module.

6. An image processing apparatus comprising at least one processor configured to implement:
    a decoder which decodes input image data; and
    a rendering module which renders the decoded image data according to a rendering cycle which corresponds to a refresh rate of a display to display a plurality of image frames of the image data,
    wherein the decoder decodes the input image data only when the processor is not being in use for rendering by the rendering module,
    wherein the rendering module transmits a decoding halt signal to the decoder to halt the decoding of the input image data and render the decoded image data.

7. The image processing apparatus of claim 1, wherein the rendering module checks the refresh rate of the display at predetermined time intervals and match the rendering cycle to the refresh rate of the display.

8. An image processing method using at least one processor, the method comprising:
    decoding input image data;
    rendering the decoded image data according to a rendering cycle which corresponds to a refresh rate of a display to display a plurality of image frames of the image data in a plurality of rendering cycles, the rendering including a correction process to match an interval between the image frames of the image data to an interval between refreshes of a display,
    wherein the rendering cycle includes a rendering period during which the rendering the decoded image data including the correction process is performed and a non-rendering period during which no rendering is performed by the rendering module,
    wherein the decoding the input image data is performed only when the processor is not being in use for the rendering, and
    wherein the decoding the input image data is performed only during the non-rendering period and not during the rendering period.

9. The method of claim 8, further comprising generating and transmitting an operation signal when the rendering is stopped to trigger the decoding the input image data.

10. The method of claim 8, wherein the decoding the input image data comprises, in response to only part of one image frame, constituting the input image data, being decoded during a current time period when the processor is not being in use for rendering, decoding the rest of the image frame in a plurality of next time periods.

11. The method of claim 8, wherein the decoding the input image data comprises, in response to only part of one image frame, constituting the input image data, being decoded during a current time period when the processor is not being in use for rendering, decoding another part of the image frame in a next time period when the processor is not being in use for rendering.

12. The method of claim 11, wherein the next time period arrives after the current time period and a time period when the processor is used by the rendering module.

13. The method of claim 8, further comprising generating and transmitting a decoding halt signal to halt the decoding the input image data and rendering the decoded image data.

14. The method of claim 8, further comprising:
    checking the refresh rate of the display at predetermined time intervals; and
    matching the rendering cycle to the refresh rate of the display.

* * * * *